United States Patent
Kondo et al.

(10) Patent No.: US 6,434,326 B1
(45) Date of Patent: Aug. 13, 2002

(54) INFORMATION REPRODUCING APPARATUS AND METHOD

(75) Inventors: Toshiyasu Kondo; Wataru Negishi, both of Tokyo-to; Shoichi Katagiri, Tokorozawa, all of (JP)

(73) Assignee: Pioneer Electronic Corp., Tokyo-to (JP)

( * ) Notice: Subject to any disclaimer, the term of this patent is extended or adjusted under 35 U.S.C. 154(b) by 0 days.

(21) Appl. No.: 09/100,512

(22) Filed: Jun. 19, 1998

(30) Foreign Application Priority Data

Jun. 20, 1997 (JP) .......................................... P9-164449

(51) Int. Cl.$^7$ ............................................. H04N 5/781
(52) U.S. Cl. .......................................... 386/125; 386/95
(58) Field of Search ............................... 386/1, 45, 95, 386/125, 126; 369/124

(56) References Cited

U.S. PATENT DOCUMENTS

| | | | | |
|---|---|---|---|---|
| 5,289,292 A | * | 2/1994 | Osada et al. ................. | 386/109 |
| 5,405,471 A | | 4/1995 | LeMaster ..................... | 156/202 |
| 5,729,516 A | * | 3/1998 | Tozaki et al. ................. | 369/58 |
| 5,838,876 A | * | 11/1998 | Iwamura ..................... | 386/125 |
| 5,909,551 A | * | 6/1999 | Tahara et al. ................ | 709/231 |
| 6,003,100 A | * | 12/1999 | Lee ............................ | 710/102 |
| 6,160,952 A | * | 12/2000 | Mimura et al. ............... | 386/95 |

FOREIGN PATENT DOCUMENTS

| | | |
|---|---|---|
| JP | 10-233081 | 9/1998 |
| JP | 10-233083 | 9/1998 |

OTHER PUBLICATIONS

Academic Society Journal of Video Information Media, vol. 51, No. 2, p. 192, (1997).*
Nikkei Multiple Media, pp. 33–34, Jan. 1997.
Academic Society Journal Video Information Media, vol. 51, No. 2, p. 192, (1997).

* cited by examiner

Primary Examiner—Andrew Faile
Assistant Examiner—Polin Chieu
(74) Attorney, Agent, or Firm—Finnegan, Henderson, Farabow, Garrett & Dunner, L.L.P.

(57) ABSTRACT

On an information record medium, information to be reproduced by an information reproducing apparatus connected to an external apparatus is recorded. The information comprises: compressed video information; first information, which relates a predetermined image portion in a video image reproduced by the information reproducing apparatus on the basis of the video information, is defined with respect to a position of the predetermined image portion in the reproduced video image, and is recorded at a record position, where the first information can be reproduced simultaneously with the predetermined image portion by the information reproducing apparatus, on the information record medium; second information, which is defined in correspondence with the first information and is recorded at a predetermined record position on the information record medium; and third information, which indicates the record position of the second information on the information record medium, indicates a command to transmit the second information to the external apparatus after reading out the second information, and is recorded at a record position, where the third information can be reproduced simultaneously with the predetermined image portion by the information reproducing apparatus, on the information record medium.

15 Claims, 9 Drawing Sheets

PHYSICAL STRUCTRE OF RECORD INFORMATION
(PHYSICAL FORMAT)

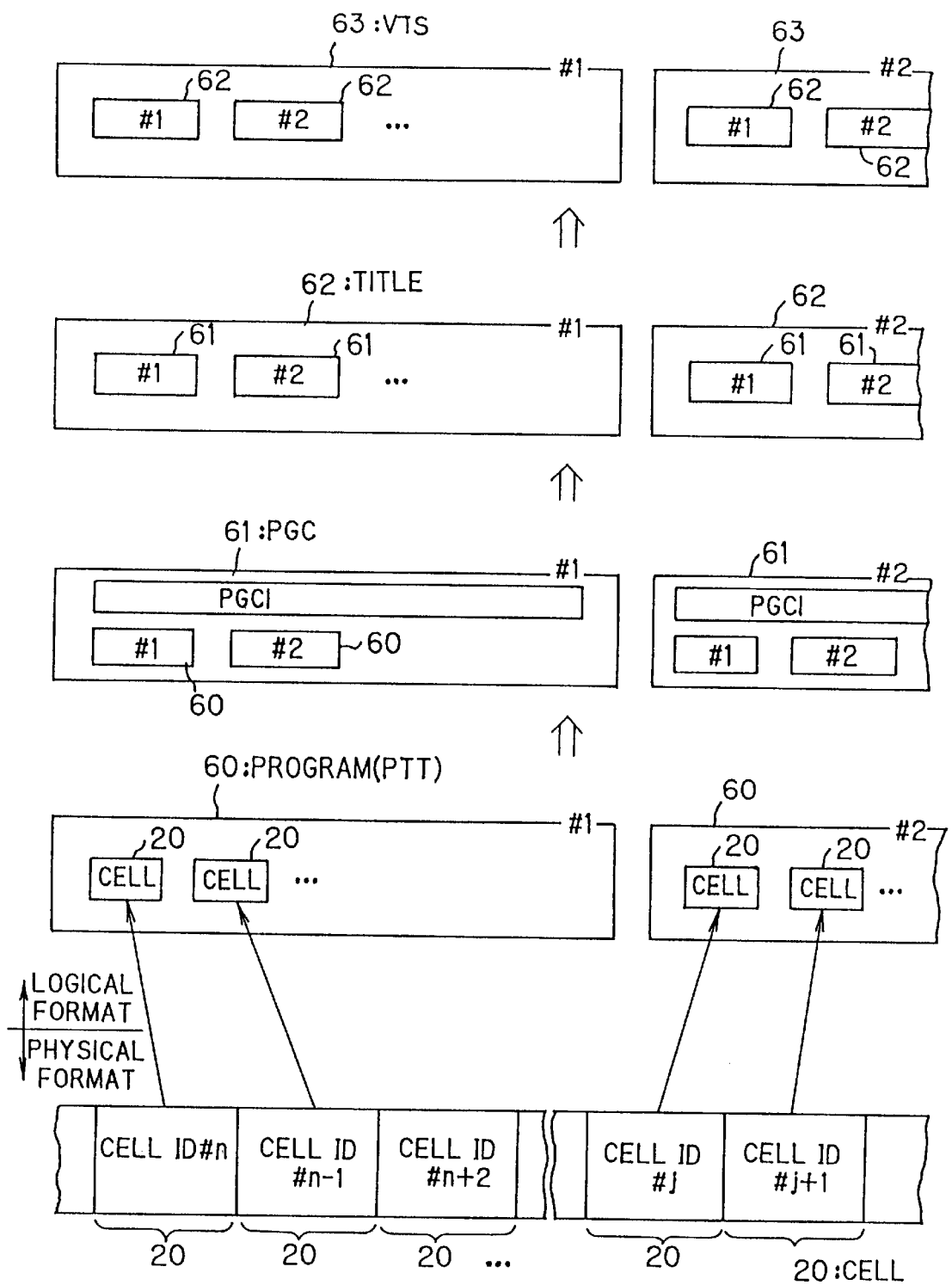

INFORMATION REPRODUCING APPARATUS AND METHOD

BACKGROUND OF THE INVENTION

1. Field of the Invention

The present invention relates to a record medium, such as a DVD or the like, and an information reproducing apparatus for reproducing the information on the record medium. More particularly, the present invention relates to a record medium, which can be reproduced by an information reproducing apparatus connected to an external device such as a personal computer or the like, and can be read in by a computer so as to control the external device, and an information reproducing apparatus for and an information reproducing method of reproducing the information on the record medium.

2. Description of the Related Art

For example, video information and audio information for sales promotion may be reproduced by an information reproducing apparatus, such as a VTR (Video Tape Recorder), a CD (Compact Disc) player, an LD (Laser Disc) player, an MD (Mini Disc) player, a DVD player or the like, to reproduce a record medium, such as a video tape, an optical disc or the like. Now, due to recent popularization of Internet, there are rapidly increased cases in which a seller servicing as a provider of the information for the sales promotion or the like has a home page of the Internet. Thus, in order to give the newest information and the detail information and provide the convenience for mail order by using the home page, the information for the sales promotion may include address information of the home page of the Internet, in many cases.

On the one hand, the operation controls, such as a reproduction and a stop of the player and the like, may be also performed through a personal computer by connecting such a player to the personal computer. Hence, due to the operation through the personal computer, after the video information or the audio information for the sales promotion is reproduced by the player, the home page corresponding on the Internet can be called by using the personal computer as necessary.

On the other hand, a standard of giving a linkage function with a home page to a disc, such as an inter disc or a video CD Internet is proposed (refer to Nikkei Multiple Media, pp. 33–34, January 1997, and an academic society journal of video information media, Vol. 51, No. 2, page 192, 1997). According to these standards, it may be considered that address information of a home page stored in a disc is read out by a personal computer to then access the home page by using this address information.

However, the communicating function to the Internet and the like which the personal computer has and the reproducing function of the player are perfectly independent of each other, in the configuration in which the operations of the player are controlled through the personal computer by connecting the above mentioned various players to the personal computer. Thus, this results in a problem that in order to call the home page through the Internet by using the personal computer, the address information of the home page to be image-displayed or audio-outputted must be inputted by a manual operation through a keyboard of the personal computer and the like.

On the other hand, according to the aforementioned standards, such as the inter disc, the video CD Internet and the like, the address information of a home page can be read out from the disc by a personal computer, similarly to the case in which a personal computer reads out an application program from a CD-ROM. Then, in accordance with this read out address information, the home page can be accessed through the Internet by the personal computer. Thus, these standards do not exceed the confine in which an input of the address information by the conventional manual operation is changed into an input of the address information through a CD-ROM drive or the like. Accordingly, the personal computer is used as a user interface to thereby carry out all the controls by using the program of the personal computer. Hence, in order to access the home page under these standards, it takes a long time to read in the OS and the like when the personal computer is started. Moreover, the system may be unstable because of the problems peculiar to the personal computer, such as the generation of a defective sector in a hard disc, the risk of an infection of a computer virus and the like. Especially, according to these standards, since the address information is treated so as to be correlated with an image recorded on the disc, the personal computer is required to have a high control ability. This results in problems that it takes a long time to start the operation and that a user operation becomes complex.

SUMMARY OF THE INVENTION

The present invention is proposed in view of the above mentioned problems. It is therefore an object of the present invent ion to provide: an information record medium, which can reduce a burden onto an external apparatus such as a personal computer or the like, when the control in relation to video information to be reproduced by an information reproducing apparatus is carried out for the external apparatus, and further enables an information reproducing apparatus to function as a user interface that is easy for a viewer to operate; the information reproducing apparatus; and an information reproducing method in the information reproducing apparatus.

The above object of the present invention can be achieved by an information record medium on which information to be reproduced by an information reproducing apparatus connected to an external apparatus is recorded. The information comprises: compressed video information; first information, which relates a predetermined image portion in a video image reproduced by the information reproducing apparatus on the basis of the video information, is defined with respect to a position of the predetermined image portion in the reproduced video image, and is recorded at a record position, where the first information can be reproduced simultaneously with the predetermined image portion by the information reproducing apparatus, on the information record medium; second information, which is defined in correspondence with the first information and is recorded at a predetermined record position on the information record medium; and third information, which indicates the record position of the second information on the information record medium, indicates a command to transmit the second information to the external apparatus after reading out the second information, and is recorded at a record position, where the third information can be reproduced simultaneously with the predetermined image portion by the information reproducing apparatus, on the information record medium.

According to the information record medium of the present invention, together with the compressed video information, the first, second and third information are recorded on the information record medium. The first information is high light information or the like in the DVD standard for example. The first information is correlated with the predetermined image portion in the video image reproduced by the information reproducing apparatus on the basis of the video information, and is defined with respect to the position of the predetermined image portion in the reproduced video image. On the other hand, the third information is high light command, the button command or the like in the DVD standard for example. The third information indicates the record position of the second information on the information record medium, and indicates the command to transmit the second information to the external apparatus after reading out the second information. And that, each of the first information and the third information is recorded at the record position where the first and third information respectively can be reproduced simultaneously with the predetermined image portion by the information reproducing apparatus, on the information record medium. Here, this "simultaneous reproduction" means a substantially simultaneous reproduction. More concretely, this "simultaneous reproduction" is not limited to such a reproduction that the time moment of reading out the information is strictly simultaneous, but includes such a reproduction that the utilization of each information such as the actual display of the video image and the like is simultaneous or in parallel by temporarily storing the video information, the first information and the third information into buffers and the like. On the other hand, the second information is the address information of the Internet which is described as the text information for example, and also the control information to control the external apparatus. The second information is defined in correspondence with the first information, and is recorded at the predetermined record position on the information record medium. This predetermined record position may be within the record area for the text information, such as the user defined file or the video manager, which is away from the position where the video information is recorded toward the inner circumference side in the DVD standard for example.

Therefore, as the information record medium of the present invention is reproduced by the information reproducing apparatus, although the video information is compressed, the second information can be appropriately read out at the predetermined position in correspondence with the request correlated with the video image requested by the viewer or audience who is watching the video image information, on the basis of the first and third information which correspond to the video information and are reproduced in parallel to the video information. As a result, any control, which is supposed to be complicated for the external apparatus since it is correlated with the compressed video information, can be easily and accurately led and performed mainly by the information reproducing apparatus for reproducing the information record medium while drastically reducing the burden on the external apparatus.

Especially, the relationship between the video information and the second information (e.g. an instruction signal) can be recognized easily and accurately as compared with the case in which the instruction signal is outputted while the video information is being reproduced through the personal computer. Hence, the instruction signal corresponding to the video image can be outputted extremely quickly, accurately, easily and cheaply as a whole. Similarly, the information record medium of the present invention is also very advantageous when the second information (e.g. an instruction signal) corresponding to the video image is outputted to the external apparatus, such as the manufacturing plant, the Internet television of the DVD built-in type or the like, according to the information record medium of the present invention.

In one aspect of the information record medium of the present invention, the video information comprises a dynamic image information to display a dynamic image, which is compressed on a time axis, and a still image information to display a still image, which is 2-dimensionally compressed.

According to this aspect, since the video information comprises the dynamic image information, which is compressed on the time axis by the MPEG2 method for example, the still image information, which is 2-dimensionally compressed, and the combinations of these two, the control correlated with the video information becomes more difficult for the external apparatus to perform but can be easily and accurately led and performed mainly by the information reproducing apparatus.

In another aspect of the information record medium of the present invention, the first information includes specific image information to display the predetermined image portion in a display manner different from that for a portion other than the predetermined image portion in the reproduced video image.

According to this aspect, since the first information includes the specific image information to display the predetermined image portion in the different display manner, such as highlight information in the DVD standard for example, it is possible to perform an emphasis-display (e.g. a highlight display) of the predetermined image portion on the basis of this specific image information. Thus, an interactive video image having a high visibility can be realized.

In another aspect of the information record medium of the present invention, the information record medium comprises a DVD.

According to this aspect, since the information record medium comprises the DVD, the video information is compression-recorded by the MPEG 2 or the like. Thus, the control correlated with various video information basically becomes very complicated. However, such a control can be easily and accurately led and performed mainly by the information reproducing apparatus for reproducing the information record medium.

In another aspect of the information record medium of the present invention, the second information includes address information in a communication network, and the external apparatus comprises an apparatus which can be connected to an address indicated by the address information on the communication network.

According to this aspect, when the second information including the address information of a home page etc., in the communication network such as the Internet for example, is transmitted, the external apparatus such as a personal computer etc., which has received this transmitted second information is connected to the address indicated by this address information on the network. Therefore, it is possible to automatically connect the external apparatus to the address correlated with the video information by means of an easy operation, mainly by the information reproducing apparatus.

In another aspect of the information record medium of the present invention, the second information includes control information to control the external apparatus in relation to the reproduced video image, and the external apparatus comprises an apparatus which can be operated in accordance with the control information.

According to this aspect, when the second information including the control information to control the external apparatus such as a manufacturing plant, a manufacturing facility or the like in relation to the reproduced video image for example, is transmitted, the operation in line with this control information is performed by the external apparatus, which has received this second information. Therefore, it is possible to easily and accurately perform the control correlated with the video information by the external apparatus.

The above object of the present invention can be also achieved by an information reproducing apparatus connected to an external apparatus, for reproducing the above described information record medium of the present invention. The information reproducing apparatus is provided with: (i) a reading device for reading out the video information, the first information, the second information and the third information from the information record medium; (ii) a processing device for applying predetermined processes including an expanding process for the video information with respect to the read out information to generate output data for displaying the video image; (iii) an inputting device for inputting a selection instruction related to the position of the predetermined image portion; (iv) a first recognizing device for recognizing the first information from the read out information, which is defined with respect to the position of the predetermined image portion in accordance with the selection instruction inputted by the inputting device; (v) a second recognizing device for recognizing the third information corresponding to the first information recognized by the first recognizing device from the read out information; (vi) an extracting device for extracting the second information which is recorded at the record position indicated by the third information recognized by the second recognizing device; and (vii) a transmitting device for transmitting the extracted second information to the external apparatus in accordance with the command indicated by the third information recognized by the second recognizing device.

According to the information reproducing apparatus of the present invention, the video information, the first information, the second information and the third information are read out from the information record medium by the reading device. Then, the predetermined processes including the expanding process for the video information are applied with respect to the read out information by the processing device, so that the output data for displaying the video image is generated. Here, when the selection instruction related to the position of the predetermined image portion is inputted by the inputting device, the first information which is defined with respect to the position of the predetermined image portion is recognized from the read out information, by the first recognizing device, in accordance with the selection instruction inputted by the inputting device. Further, the third information corresponding to the first information recognized by the first recognizing device is recognized from the read out information by the second recognizing device. Then, the second information, which is recorded at the record position indicated by the third information recognized by the second recognizing device, is extracted by the extracting device. Finally, the extracted second information is transmitted to the external apparatus, in accordance with the command indicated by the third information recognized by the second recognizing device, by the transmitting device.

Therefore, as the aforementioned information record medium as well as any one of its various aspects of the present invention is reproduced by the information reproducing apparatus of the present invention, although the video information is compressed, the second information can be appropriately read out at the predetermined position in correspondence with the request correlated with the video image requested by the viewer or audience who is watching the video image information, on the basis of the first and third information which correspond to the video information and are reproduced in parallel to the video information. As a result, any control, which is supposed to be complicated for the external apparatus since it is correlated with the compressed video information, can be easily and accurately led and performed mainly by the information reproducing apparatus for reproducing the information record medium while drastically reducing the burden on the external apparatus.

Especially, the relationship between the video information and the second information (e.g. an instruction signal) can be recognized easily and accurately as compared with the case in which the instruction signal is outputted while the video information is being reproduced through the personal computer. Hence, the instruction signal corresponding to the video image can be outputted extremely quickly, accurately, easily and cheaply as a whole. Similarly, the information record medium of the present invention is also very advantageous when the second information (e.g. an instruction signal) corresponding to the video image is outputted to the external apparatus, such as the manufacturing plant, the Internet television of the DVD built-in type or the like, according to the information reproducing apparatus of the present invention.

In one aspect of the information reproducing apparatus of the present invention, the second information is recorded at the record position where the second information cannot be reproduced simultaneously with the predetermined image portion by the information reproducing apparatus. The information reproducing apparatus further comprises: a controlling device for controlling the reading device to read out the second information in advance of reading out the video information; and a memory device for storing the second information which has been read out in advance by the reading device. And that, the extracting device extracts the second information through the memory device.

According to this aspect, the second information is recorded at the record position, where the second information cannot be reproduced simultaneously with the predetermined image portion by the information reproducing apparatus, such as a record position within the record area for the text information in the video manager, which is away from the position where the video information is recorded toward the disc inner circumference side in the DVD standard, for example. In this case, under the control of the controlling device, the second information is read out in advance of reading the video information by the reading device, and is stored into the memory device. After that, the second information is extracted from the memory device by the extracting device. Incidentally, if the second information is the text information described in the video manager for example, since the memory capacity required to store the second information can be relatively small, it is practically advantageous to store the second memory into the memory device in advance in this manner. Further, it is also possible to quickly transmit the second information. As a result, it is possible to perform the control for the external apparatus quickly and in parallel to the reproduction display based on the video information.

In another aspect of the information reproducing apparatus of the present invention, the second information is recorded at the record position where the second information cannot be reproduced simultaneously with the predetermined image portion by the information reproducing apparatus. The information reproducing apparatus further comprises a controlling device for controlling the reading device to read out the second information after reading out the video information. And that, the extracting device extracts the second information read out after the video image.

According to this aspect, the second information is recorded at the record position, where the second information cannot be reproduced simultaneously with the predetermined image portion by the information reproducing apparatus, such as a record position within the record area for the user defined file, which is away from the position where the video information is recorded toward the disc inner circumference side in the DVD standard, for example. In this case, under the control of the controlling device, the second information is read out after reading the video information by the reading device. After that, this read out second information is extracted by the extracting device. Incidentally, if the second information is the text information described in the user defined file for example, since the memory capacity required to store the whole of the user defined file may be large, it is practically advantageous to read out only the desired second information after reading the video information in this manner (i. e. , without storing the second information in advance into the memory). In this manner, although the ordinary reproduction operation may be temporarily stopped while the second information is extracted and transmitted, this aspect is advantageous since the memory device for keeping the second information is not necessary.

In another aspect of the information reproducing apparatus of the present invention, the first information includes specific image information to display the predetermined image portion in a display manner different from that for a portion other than the predetermined image portion in the reproduced video image. The processing device comprises an emphasis display device for generating the output data for displaying the video image so as to display the predetermined image portion, which is selection-instructed by the inputting device, in the different display manner in accordance with the specific image information.

According to this aspect, since the first information includes the specific image information to display the predetermined image portion in the different display manner, such as highlight information in the DVD standard for example, when the selection-instructed is inputted by the inputting device, the output data for displaying the video image is generated so as to display the predetermined image portion, in the different display manner in accordance with the specific image information. As a result, it is possible to perform an emphasis-display (e.g. a highlight display) of the predetermined image portion by this output data. Thus, an interactive video image having a high visibility can be realized.

In another aspect of the information reproducing apparatus of the present invention, the information record medium comprises a DVD, and the information reproducing apparatus comprises a DVD player.

According to this aspect, since the information record medium comprises the DVD and since the information reproducing apparatus comprises the DVD player, the video information is compression-recorded by the MPEG 2 or the like. Thus, the control correlated with various video information basically becomes very complicated. However, such a control can be easily and accurately led and performed mainly by the information reproducing apparatus for reproducing the information record medium.

In another aspect of the information reproducing apparatus of the present invention, the second information includes address information in a communication network. The external apparatus comprises an apparatus which can be connected to an address indicated by the address information on the communication network. And that, the transmitting device transmits the address information to the external apparatus.

According to this aspect, the second information including the address information of a home page etc., in the communication network such as the Internet for example, is transmitted by the transmitting device. Then, the external apparatus such as a personal computer etc., which has received this transmitted second information is connected to the address indicated by this address information on the network. Therefore, it is possible to automatically connect the external apparatus to the address correlated with the video information by means of an easy operation, mainly by the information reproducing apparatus.

In another aspect of the information reproducing apparatus of the present invention, the second information includes control information to control the external apparatus in relation to the reproduced video image. The external apparatus comprises an apparatus which can be operated in accordance with the control information. And that, the transmitting device transmits the control information to the external apparatus.

According to this aspect, the second information including the control information to control the external apparatus such as a manufacturing plant, a manufacturing facility or the like in relation to the reproduced video image for example, is transmitted by the transmitting device. Then, the operation in line with this control information is performed by the external apparatus, which has received this second information. Therefore, it is possible to easily and accurately perform the control correlated with the video information by the external apparatus.

In another aspect of the information reproducing apparatus of the present invention, the information reproducing apparatus is built in the external apparatus.

According to this aspect, since the information reproducing apparatus is built in the external apparatus such as a television of DVD built-in type, an Internet television of DVD built-in type or the like, the second information transmitted by the transmitting device can be utilized efficiently within the external apparatus in which the information reproducing apparatus is built-in, so that it is possible to quickly and accurately perform the control correlated with the video information. Further, since the inputting device, the displaying device etc., such as a remote-controller, an operation switches or buttons, a key board and so on of the information reproducing apparatus can be commonly used as an inputting device, a displaying device etc. of the external apparatus, this aspect is quite advantageous in a practical sense.

The above object of the present invention can be also achieved by an information reproducing method, in an information reproducing apparatus connected to an external apparatus, of reproducing the above described information record medium of the present invention. The information reproducing method is provided with: (i) a reading process of reading out the video information, the first information, the second information and the third information from the information record medium; (ii) a processing process of applying predetermined processes including an expanding process for the video information with respect to the read out information to generate output data for displaying the video image; (iii) an inputting process of inputting a selection instruction related to the position of the predetermined image portion; (iv) a first recognizing process of recognizing the first information from the read out information, which is defined with respect to the position of the predetermined image portion in a accordance with the selection instruction inputted by the inputting process; (v) a second recognizing process of recognizing the third information corresponding to the first information recognized by the first recognizing process from the read out information; (vi) an extracting process of extracting the second information which is recorded at the record position indicated by the third information recognized by the second recognizing process; and (vii) a transmitting process of transmitting the extracted second information to the external apparatus in accordance with the command indicated by the third information recognized by the second recognizing process.

According to the information reproducing method of the present invention, in the same manner as the above described information reproducing apparatus of the present invention, although the video information is compressed, the second information can be appropriately read out at the predetermined position in correspondence with the request correlated with the video image requested by the viewer or audience who is watching the video image information, on the basis of the first and third information which correspond to the video information and are reproduced in parallel to the video information. As a result, any control, which is supposed to be complicated for the external apparatus since it is correlated with the compressed video information, can be easily and accurately led and performed mainly by the information reproducing apparatus for reproducing the information record medium while drastically reducing the burden on the external apparatus.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 2 is a diagram showing a logical structure of the record information of the DVD in FIG. 1;

DETAILED DESCRIPTION OF THE PREFERRED EMBODIMENTS

Referring to the accompanying drawings, embodiments of the present invention will be now explained. The following explanations will be done for the embodiments, in which the present invention is applied to the aforementioned DVD.

(I) Embodiment of Information Record Medium

First of all, a physical structure and a logical structure of a DVD, as one embodiment of the information record medium to which the present invention is applied, will be explained with reference to FIGS. 1 to 3.

Figure 1:
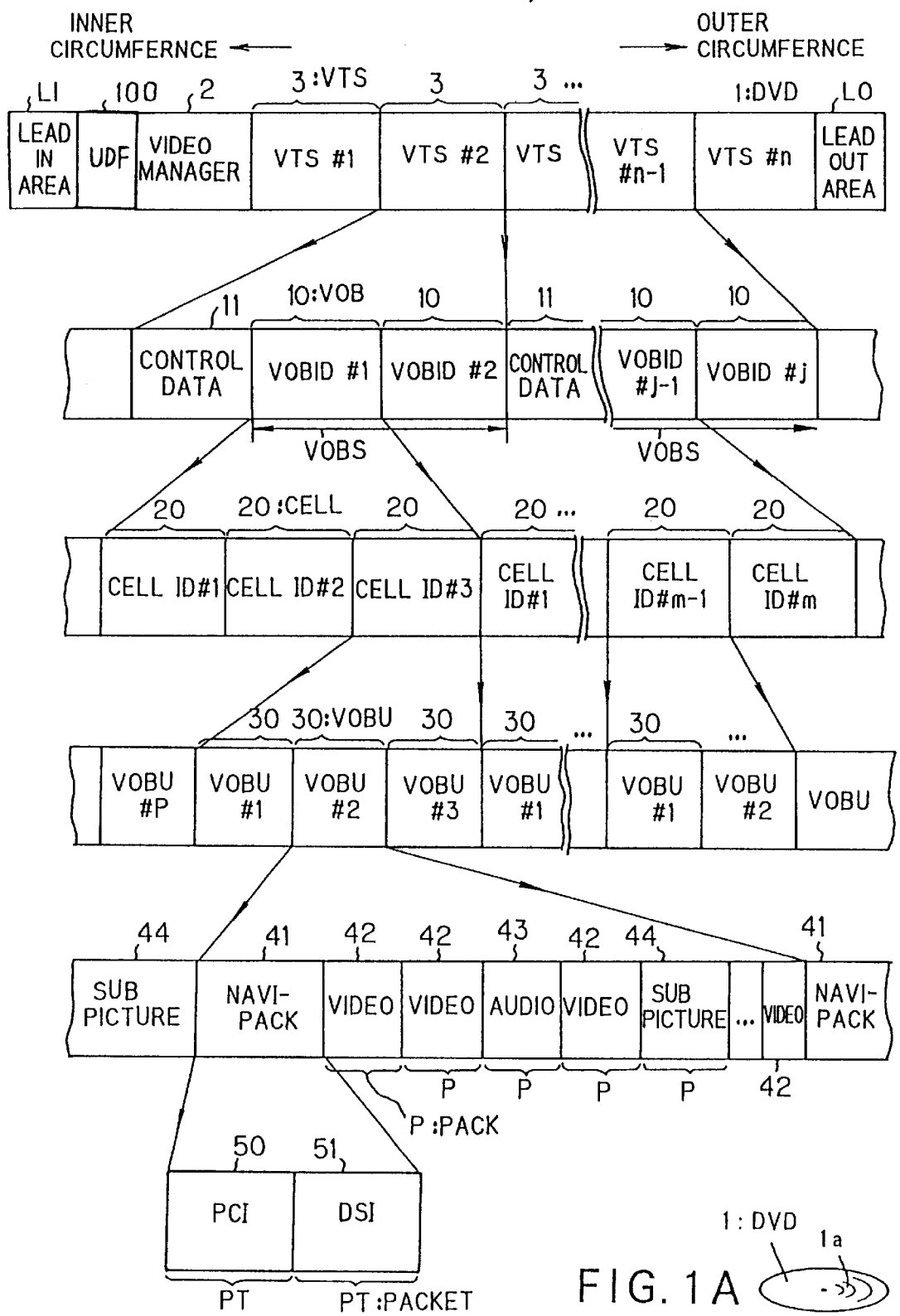
FIG. 1 is a diagram showing a physical structure of record information of a DVD as one embodiment of the present invention.

At first, a record format of video information and audio information on a record track of the DVD (i.e. a physical record format) is explained by use of FIG. 1.

As shown in FIG. 1, a DVD 1 as the present embodiment is provided with a lead in area LI at its most inner circumferential portion and a lead out area LO at its most outer circumferential portion, between which video information and audio information are recorded along the record track such that they are divided into a plurality of VTSs 3, each of which has a unique ID (Identification) number (i.e. VTS#L to VTS#n). Here, the VTS (Video Title Set) 3 is a set (bundle) of titles (each of which is one production or one work which an author or producer intends to offer to the audience), which are related to each other (e.g., which attribute, such as the number, the specification, the corresponding languages etc. of audio and video streams is the same to each other). More concretely, a plurality of movies which are related to the same movie to each other but which languages of serifs (lines) are different from each other may be recorded as different titles respectively, or even in case of the same movies, the theater version and the special version may be recorded as different titles respectively. Ahead of the area where the VTSs 3 are recorded, a UDF (User Defined File) 100 described later in detail and a video manager 2 are recorded as shown in FIG. 1. Incidentally, the position of the UDF 100 may be any position as long as it is between the lead in area LI and the lead out area LO.

Figure 1A:
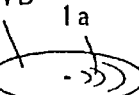
FIG. 1A is a perspective view of the DVD in FIG. 1.

These video, audio and control informations are recorded on a spiral or coaxial record track 1a of the DVD 1 as shown in FIG. 1A.

One VTS 3 is recorded such that it is divided into a plurality of VOBs (Video OBjects) 10, each of which has an ID number (VOB ID#1, VOB ID#2, . . . ), and control data 11 disposed ahead of the VOBs 10. Here, a data portion constructed by a plurality of VOBs 10 is defined as a VOB set (VOBS) as shown in FIG. 1.

In the control data 11 recorded at the head of the VTS 3, information such as PGCI (ProGram Chain Information), which is various information related to a program chain as a logical division obtained by combining a plurality of cells (the "cell" will be described later in detail), is recorded. In each VOB 10, the substantial portion of the video and audio information (i.e. the video and audio information itself other than control information) besides the control information are recorded.

Further, one VOB 10 is constructed of a plurality of cells 20, each of which has an ID number (cell ID#1, cell ID#2, . . . ).

Nextly, one cell 20 is constructed of a plurality of VOB units (VOBUs) 30, each of which has an ID number (VOBU#1, VOBU#2, . . . ). Here, the VOB unit 30 is an information unit, each of which includes the video information, the audio information and sub picture information (which is defined as information of a sub picture such as a subtitle of a movie etc.).

One VOB unit 30 is provided with: a navi-pack (a navigation pack) 41 for the control information; a video pack 42 for the video information; an audio pack 43 for the audio information; and a sub picture pack 44 for the sub picture information. Here, in the video pack 42, a packet including the video data with additional information such as a header thereof is recorded. In the audio pack 43, a packet including the audio data with additional information such as a header thereof is recorded. Further, in the sub picture pack 44, a packet including graphics such as a character and a diagram as the sub picture, with additional information such as a header thereof is recorded.

It is prescribed by a standard specification of the DVD that there are 8 kinds of audio recordable on the DVD 1 while 32 kinds of sub picture recordable on the DVD 1. Further, there always exists the navi-pack 41 in one VOBU 30. On the other hand, there may not exist each of the video pack 42, the audio pack 43 and the sub picture pack 44 in one VOBU 30, or, even in case that these packs exist in one VOBU 30, the number of the packs and the order of the packs are freely determined.

Finally, the navi-pack 41 is provided with: a DSI (Data Search Information) packet 51 including search information to search a video image or an audio sound desired to be displayed or sound-outputted (concretely, search information such as an address, where the video or audio to be displayed or sound-outputted is recorded, on the DVD 1); and a PCI (Presentation Control Information) packet 50 including information related to a display control at a time of displaying the video image or outputting the audio sound, which is searched on the basis of the information of the DSI packet 51. Further, all video data included in one VOBU 30 consist of at least one GOP (Group Of Pictures). In the PCI packet 50, high light information, which defines a display or operation at a time when one selection item is selected out of selection items by the audience, is included.

The high light information includes information related to a so-called user interface with the audience. For example, the high light information includes: effective time duration information indicating an effective time duration during which a selection button displayed in a menu picture plane etc. in correspondence with each option for the selection of the audience can validly perform its selecting operation (since the effective time duration may be valid over a plurality of VOB unit 30, the effective time duration is defined by a start time and an end time of the effective time duration); color information to display the color of the selection button while changing the color on the basis of the selecting operation by the audience; positional information indicating a position to display the selection button; and movement information indicating a movement destination when the moving operation of the cursor indicating the pertinent selection button is selected is executed on the basis of the selecting operation by the audience. Especially, the information related to the button among the above mentioned various high light information, is called as "button information", hereinbelow. Furthermore, the high light information includes: command information indicating an operation to be executed when the pertinent selection button is selected in correspondence with each selection button (hereinbelow, it is referred to as a "button command"); and command information indicating an operation to be executed in correspondence with the selection or request with respect to the high light image including the above mentioned button command (hereinbelow, it is referred to as a "high light command").

The information described in the high light information relates to the selection button which is displayed by use of the data recorded in the sub picture pack 44. The selection options corresponding to the selection items are displayed such that they are superimposed on the video image which is displayed on the basis of the video information in the video pack 42 (included within the VOB unit 30).

Incidentally, in order to make the good use of the high light information which is independent from the video image, in an information reproducing apparatus described later is constructed to separate the high light information from the PCI packet 50 by a decoder for decoding the PCI packet 50 and to decode this separated or extracted high light information by an exclusive high light decoder.

By the above explained high light information, for example, the change of the picture plane display with respect to the item selection, the display position to be changed with respect to the selection item selected on the menu picture plane, which displays selection items for the audience to select, and the high light command, the button command etc., corresponding to the selected item are set.

In FIG. 1 again, the video information to construct and display a frame, a selection button and the like, which is required to construct and display the menu picture plane, is recorded in the sub picture pack 44 as the sub picture information.

Further, the above described GOP is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment.

Namely, in the present embodiment, the time compression of the moving picture is performed by a variable rate in which the data amount in each GOP is not constant, according to the MPEG 2 method.

In case that the video image to be recorded and reproduced is a still picture, the still picture may be recorded after it is 2-dimensionally compressed by a known 2-dimensional image compression method.

In the above explained record format having a hierarchical structure as shown in FIG. 1, each division can be freely set according to the author's intention, so as to perform recording on the basis of these set divisions. By performing the reproduction on the basis of a later described logical structure for each of these divisions, the variegated reproduction can be performed.

Nextly, a logical format (logical structure) constructed by combining the information recorded by the physical divisions shown in FIG. 1 is explained with reference to FIG. 2. The information is not actually recorded on the DVD 1 in the logical structure of FIG. 2. Instead, information (e.g. access information or time information) to reproduce each data shown in FIG. 1 by combining them (especially combining the cells 20) in the logical structure shown in FIG. 2, is recorded on the DVD 1, especially in the control data 11.

To make the explanation clear, the following explanation is made from the lower hierarchical layer in FIG. 2. One program 60 is logically constructed on the basis of the author's intention by selecting and combining a plurality of cells 20 among the physical structures explained by use of FIG. 1. The program 60 is also a minimum logical unit, which division can be identified by the reproducing apparatus described later and which can be accessed by use of a command by the reproducing apparatus. It is also possible for the author to define a gathering of one or more programs 60 as a minimum unit, which can be freely selected to be watched or listened to by the audience and which is referred to as a PTT (ParT of Title).

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG. 2, the number is treated as the cell number in the order of description in the PGCI described later.

Next, by combining a plurality of programs 60, one PGC (Program Chain) 61 is logically constructed on the basis of the author's intention. The aforementioned PGCI (ProGram Chain Information) is defined by a unit of the PGC 61. The PGCI includes information indicating: the reproduction order for each program 60 at a time of reproducing each program 60 (by this reproduction order, a unique program number (#1, #2, . . . ) is assigned to each program 60); the reproduction order for each cell 20 (by this reproduction order, a unique cell number is assigned to each cell 20); an address which is a record position of each cell 20 on the DVD 1; the number of the cell 20 positioned at the head of one program 60 to be firstly reproduced; a reproduction method for each program 60 (e.g., a random reproduction, a shuffle reproduction, a loop reproduction and soon); and various commands (e.g. commands able to be specified by the author for each PGC 61 or each cell 20, which is referred to as a "cell command" hereinbelow). The recording position of the PGCI on the DVD 1 may be in the control data 11 as aforementioned, or in a control data (not illustrated) in the video manager 2 if the pertinent PGCI is related to the menu in the video manager 2 (refer to FIG. 1).

In one PGC 61, the substantial video and audio data etc. are included as a combination of the programs 60 (in other words, the combination of the cells 20) other than the above mentioned PGCI.

Then, one title 62 is logically constructed of one or a plurality of PGCs 61 (PGC #1, PGC#2, . . . ) as shown in FIG. 2. The title 62 is, for example, a unit corresponding to one movie, and is completed information which the author would like to offer to the audience of the DVD 1.

Finally, one VTS 63 is logically constructed of one or a plurality of titles 62 (title #1, title #2, . . . ) as shown in FIG. 2. The title 62 included in the VTS 63 has the attributes common to each other. For example, the movies based on one movie but in different languages correspond to the respective titles 62. The information included in one VTS 63 shown in FIG. 2 corresponds to information included in one VTS 3 shown in FIG. 1.

As the author specifies the information divided in the physical structure on the DVD 1 on the basis of the above described logical format, the video image (e.g. the movie image) for the audience to watch is to be formed.

In the explanations for the physical structure shown in FIG. 1, for the easy understanding of the content, it has been explained such that a plurality of cells 20 are recorded in the order of the ID numbers. However, in the DVD 1 of the present embodiment, one cell 20 may be divided into a plurality of interleaved units IU to be actually recorded on the DVD 1. In this case, when the PGCs 61 including the cells 20 whose ID numbers are discontinuous to each other are reproduced, the signal outputted from the track buffer in the reproducing apparatus can be made continuous, so that the video image can be reproduced without the interruption or ceasing of the displayed video image.

Next, the UDF 100 and the video manager 2 shown in FIG. 1 according to the present invention will be explained in detail among the video information, the audio information and the various control information having the above-mentioned physical structure and logical structure.

Various data are freely written into the UDF 100 by an author or producer by using respective descriptors of MicroUDF standard that is a subset of an ISO13346 and an ISO 9669 standard. Especially, the author can write the address information of a home page of the Internet to this UDF 100.

The information with regard to the whole of the video information and the audio information to be recorded on the DVD 1 is recorded in the video manager 2. FIG. 3 shows an actual example of a detailed data configuration of the video manager 2.

Figure 3:
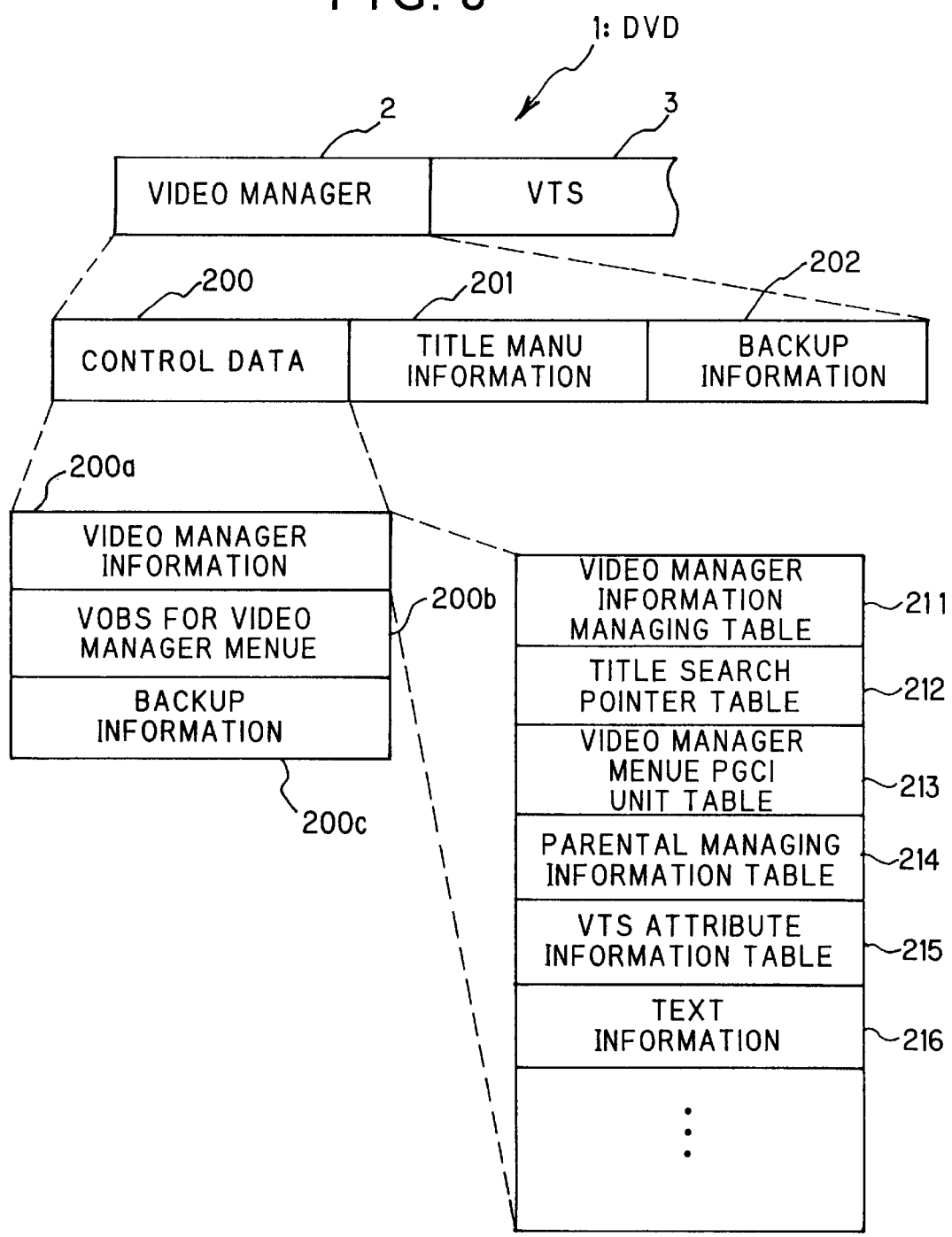
FIG. 3 is a diagram showing a physical structure of a video manager of the DVD in FIG. 1.

In FIG. 3, the video manager 2 is provided with: control data 200 described later; title menu information 201 for image-displaying a menu in which names of titles and the like are arranged; and backup information 202 of the control data 200. The control data 200 is composed of video manager information 200a, a VOB 200b for a video manager menu and backup information 200c of the video manger information.

The video manager information 200a is non-real time control information, and is provided with: a video manager control information managing table 211 servicing as a table to mange the video manager information itself; a title search pointer table 212 in which a title set number belonging to each title to directly execute a title search by a numeral input, a title number within the title set, an address and the like are described; a video manger menu PGC information unit table 213 which is PGC control information (PGCI) constituting a title menu included in the video manger and constitutes a unit table classified by each language; a parental managing information table 214 to mange a parental level; a VTS attribute information table 215 to which VTS attribute information described in the VTS control information with regard to all VTSs are collectively copied; and text information 216.

Especially, character information classified by a language for each title is described in the text information 216 in a text form. For example, if it is a movie, a name of the movie, a name of a director, a name of a leading actor (actress) and the like are described in the text information 216. If it is a music, a name of a songwriter, a name of a composer, a name of a singer and the like are described therein. They are used for a search within a disc, a character information display and the like. Especially, the address information of the home page of the Internet detailed later can be freely written to the text information 216 by the author. That is, the control information to be correlated with the reproduced image of the address information of the home page of the Internet is written into at least one of the text information 216 and the UDF 100 by the author, in this embodiment. This text information 216 is based on, for example, HTML (Hyper Text Markup Language a sentence description type language used in the Internet and the like).

As mentioned above, the control information such as the address information of the home page described in the UDF 100 or the text information 216 of the DVD 1 by the author is used together with the above mentioned highlight information and the like, when the reproducing apparatus controls the external apparatus such as the personal computer and the like as described below. Accordingly, this enables the reproducing apparatus for reproducing the video information to effectively function as a user interface to carry out the control in relation to the reproduced video information in the external apparatus such as the personal computer and the like.

(II) Embodiment of Reproducing Apparatus

Next, an embodiment of the reproducing apparatus for reproducing the information recorded on the DVD 1 is explained with reference to FIG.4.

At first, a configuration and an operation of the reproducing apparatus in this embodiment are explained with reference to FIG. 4.

Figure 4:
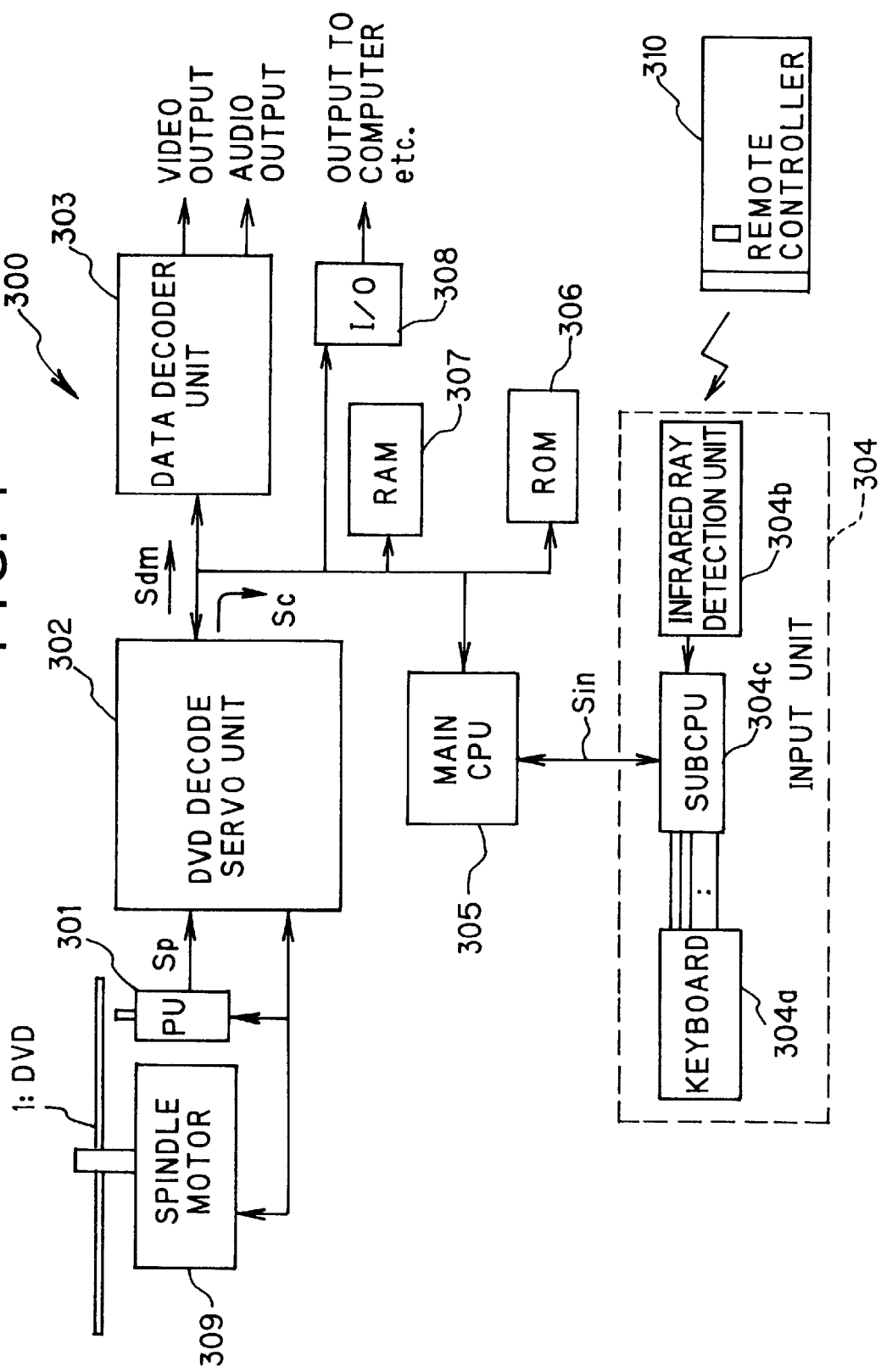
FIG. 4 is a block diagram of an information reproducing apparatus for reproducing the DVD in FIG. 1, as another embodiment of the present invention.

As shown in FIG. 4, a reproducing apparatus 300 according to this embodiment is provided with an optical pickup (PU) 301, a DVD decode servo unit 302, a data decoder unit 303 for decoding the sub-picture data, the PCI data and the like in addition to the video data and audio data, an input section 304, a main CPU 305, an ROM 306, an RAM 307, an I/O (Input/Output) interface 308 and a spindle motor 309.

The input section 304 is provided with a keyboard 304a such as a matrix type or the like, a light receiving section 304b for receiving an infrared ray (signal) from a remote controller 310 and a sub-CPU 304c for carrying out the input control for a signal from the light receiving section 304b.

The I/O interface 308 is an interface, for example, for RS232C and then outputs data in an ASCII (American National Standard Code for Information Interchange) code to an external apparatus, such as a personal computer and the like. Moreover, various data can be inputted through the I/O interface 308 from the external apparatus, such as the personal computer and the like.

Incidentally, the configuration shown in FIG. 4 mainly illustrates the portions with regard to the reproduction of the video image and the audio sound, in the structure of the reproducing apparatus 300. A servo circuit for servo-controlling the pickup 301, a slider motor of the pickup 301, a liquid crystal display mounted on a front panel of the body of the reproducing apparatus and the like are similar to those of the conventional apparatus. Thus, the illustrations and the detailed explanations are omitted.

Next, the whole operation is explained.

The pickup 301 contains a light source and an optical system which are not shown, and radiates a light beam servicing as a reproduction light onto the DVD 1, and also receives a reflection light of the light beam from the DVD 1, and further outputs a detection signal Sp corresponding to an information pit formed on the DVD 1. At this time, a tracking servo control and a focus servo control are carried out in the same manner as the conventional art so that the light beam is exactly radiated onto an information track on the DVD 1 and also exactly focused on an information record surface of the DVD 1.

The detection signal Sp outputted by the pickup 301 is inputted to the DVD decode servo unit 302. Then, a demodulating process and an error correcting process are carried out, and accordingly a decoded signal is generated. At this time, a track buffer (not shown) compensates the difference between the data amounts for the respective GOPs in the MPEG2 method. Moreover, even if the detection signal Sp is discontinuously inputted when the data divided into interleave units IU is read, this action of the track buffer enables the continuous demodulation signal to be obtained from the DVD decode servo unit 302. In the DVD decode servo unit 302, the demodulation signal is also inputted to a system buffer (not shown). The management information and the like (the video manager 2 and the like) with regard the whole information recorded on the DVD 1 and the control data II of the VTS 3 are accumulated therein and then outputted to the main CPU 305 as a control information Sc, and further the DSI packet 51 for each navigation pack 41 is transiently accumulated therein during the reproduction of the information as necessary, and then outputted to the main CPU 305 as the control information Sc. Furthermore, in the DVD decode servo unit 302, the continuously generated demodulation signal is de-multiplexed by a de-multiplexer (not shown), and thereby the video information, the audio information, the sub-video information and the PCI packet 50 for each navigation pack 41 are separated, and then outputted to the data decoder unit 303 as various data signals Sdm, such as the video signal, the audio signal, the sub-picture signal, the PCI signal and the like.

When the data signals Sdm, such as the video signal, the audio signal and the like, are inputted, the data signals Sdm are respectively transiently accumulated and then decoded by a dedicated buffer and a dedicated decoder which are installed for the various signals and not shown in FIG.4.

More practically, for example, the variation between the data amounts is compensated by the buffer, for the video signal. Moreover, the video signal is demodulated by the MPEG2 method and outputted to a display device (not shown), such as a CRT (Cathode Ray Tube) and the like, as a demodulated video output.

After the sub-picture signal is transiently accumulated in the buffer, it is demodulated and mixed at a timing in synchronization with the video signal corresponding to the sub-picture signal, and then outputted as a part of the demodulated video output. Incidentally, if this sub-picture signal includes the video information to constitute a frame, a selection button and the like which are necessary to constitute and display the menu screen, the display states of the selection buttons to be displayed and the like are changed on the basis of the highlight control signal from the main CPU 305, and then the sub-picture signal is outputted.

On the other hand, after the audio signal is transiently accumulated in the buffer, a predetermined decoding process is carried out for the audio signal. Then, it is audio-outputted to a speaker (not shown) and the like at a timing in synchronization with the video signal or the sub-picture signal.

Moreover, after the PCI signal is transiently accumulated in the buffer, a predetermined decoding process is carried out for the PCI signal. Then, it is outputted to the main CPU 305 at a timing in synchronization with the video signal, the sub-picture signal or the audio signal. At this time, the highlight information included in the PCI signal (the PCI packet 50) is especially separated as the highlight signal.

A time axis compensation to exactly change the display state of the selection item (selection button) corresponding to this highlight information is carried out for this highlight signal, by the dedicated buffer installed within the DVD decode servo unit 302, on the basis of the sub-picture signal which includes the video information for the highlight information indicated by the highlight signal. Then, the highlight signal to which the time axis compensation has been applied is decoded and then outputted to the main CPU 305. Now, the main CPU 305 outputs the highlight control signal to the DVD decode servo unit 302 in order to change the display state by the highlight information based on this highlight signal. At this time, in order to validate the selection operation using the menu screen and the like based on the highlight information indicated by the highlight signal, the main CPU 305 receives a selection operation by an input signal Sin from the input section 304 and also outputs the highlight control signal.

The main CPU 305 outputs a predetermined kind of control signal to the DVD decode servo unit 302 and the data decoder unit 303, in order to carry out the exact reproduction, based on the control signal Sc from the DVD decode servo unit 302, the PCI signal or the highlight signal form the data decoder unit 303 and the input signal Sin inputted from the input section 304.

An example of the selection of the menu type using the highlight information is explained with reference to FIG. 5.

Figure 5:
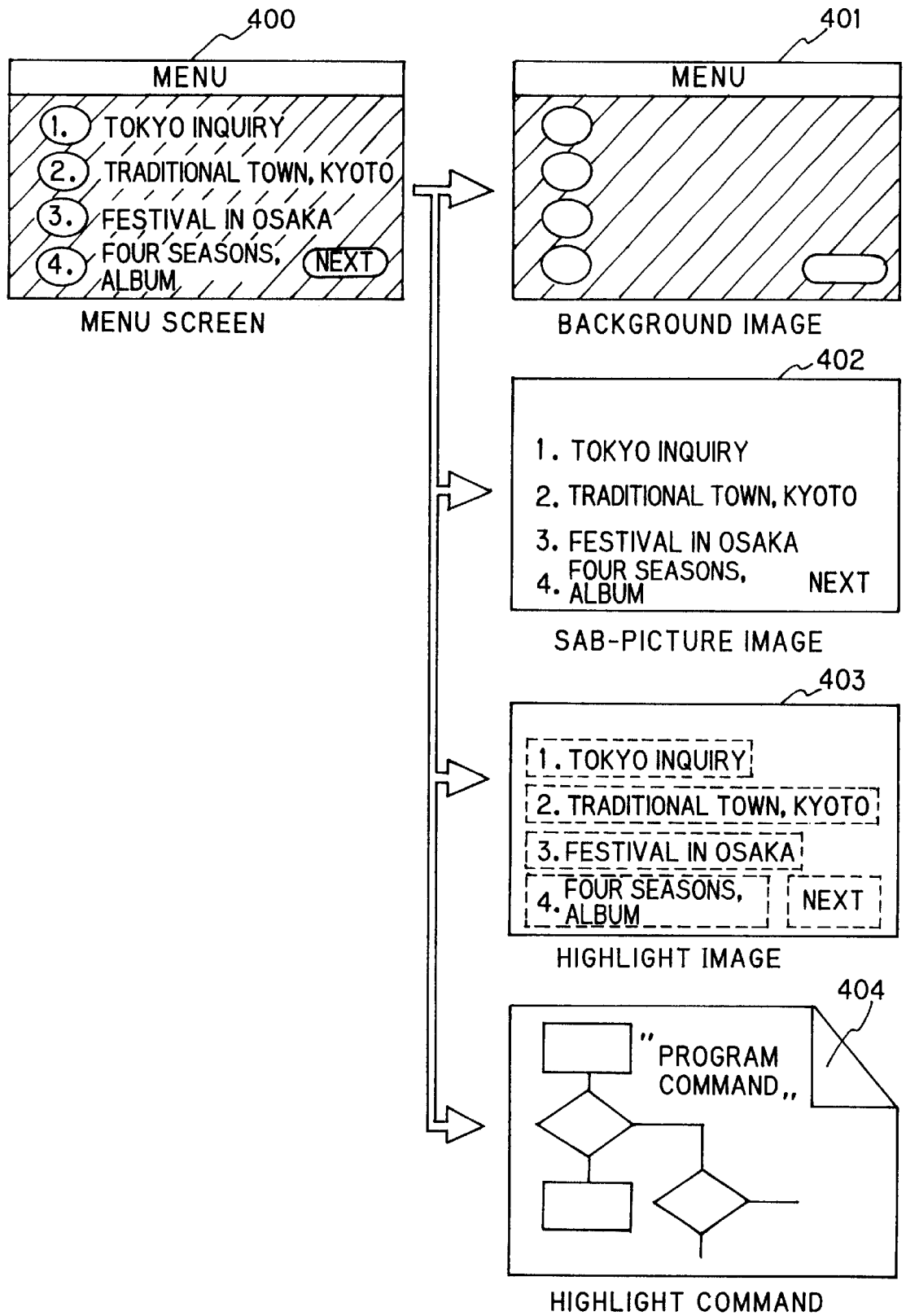
FIG. 5 is a diagram showing a structure of a menu picture plane in the present embodiment.

In FIG. 5, a menu screen 400 is displayed on the display device, such as the CRT and the like, by the reception of the video outputted from the reproducing apparatus 300 in FIG. 4. With an image output resulting from the MPEG2 as a background image 401, this menu screen 400 is generated by superimposing a sub-picture image 402 resulting from the sub-picture output on the background image 401 and further superimposing on them a highlight image 403 resulting from the highlight signal.

Various types, such as a type in which a still or static image is recorded for a display period, a type of partially or entirely dynamic image and the like, can be prepared as the background image 401 by using the video information which is MPEG-encoded. That is, the background image may be dynamic or static. There is no special limit on the number of colors with regard to the screen configuration. A black image is also allowable.

The sub-picture image 402 is the main portion of the menu screen, and mainly indicates the number of the selections and the content of the selections. It is also possible to assign a transparent color to a portion in which the background image is to be transparently viewed.

Moreover, in the highlight image 403, in order to check the selection with regard to any selected item from the selection items listed on the menu, a display color and a luminance of a frame of the selected item are changed to a predetermined select ion color and selection luminance in accordance with the highlight command and the button command. Furthermore, in order to check the execution of the selected item, the display color and the luminance of the frame of the executed item are changed to a predetermined execution color and execution luminance in accordance with the highlight command and the button command.

If the highlight command and the button command are included in the highlight information as mentioned above, for example, a highlight command 404 is outputted to the main CPU 305 based on the menu selection and the execution content. In this way, the highlight command 404 is a program instruction sentence to instruct how the reproducing apparatus 300 operates for the selected item, in relation to the sub-picture image 402 and the highlight image 403. The highlight command 404 is a command of instructing a file name to be read out and reading out the file name, for example, based on a selected option. This content is not displayed on the menu screen 400. It can be recognized by only the reproducing apparatus 300.

Incidentally, the menu screen 400 can be displayed even without the sub-picture image 402, depending on the display content of the highlight image 403. For example, if the background image 401 is assumed to be the dynamic image or the static image with regard to one scene of a movie, a commodity or product name and an index can be superimposed at the vicinities of an actor (actress) and the commodity on the screen. Such a menu screen enables the commodity name to be displayed as a target item of the menu selection and also enables the images of the actor (actress) and the commodity itself to be set to selection positions. Moreover, the highlight image 403 is the image to recognize the highlighted position. Thus, if there is only one kind of selection option on the whole menu screen (since it can be selected by a proper button operation), the highlight image 403 may be omitted. The screen targeted when the button command is pushed may be displayed while maintaining the state of the dynamic image, or may be implemented as a still image at a cell unit by the cell command described in the above mentioned PGCI (refer to FIG. 2).

Next, actual various examples of the above mentioned reproducing apparatus 300 are explained with reference to FIGS. 6 to 10.

(II-1) First Actual Example

Figure 6:
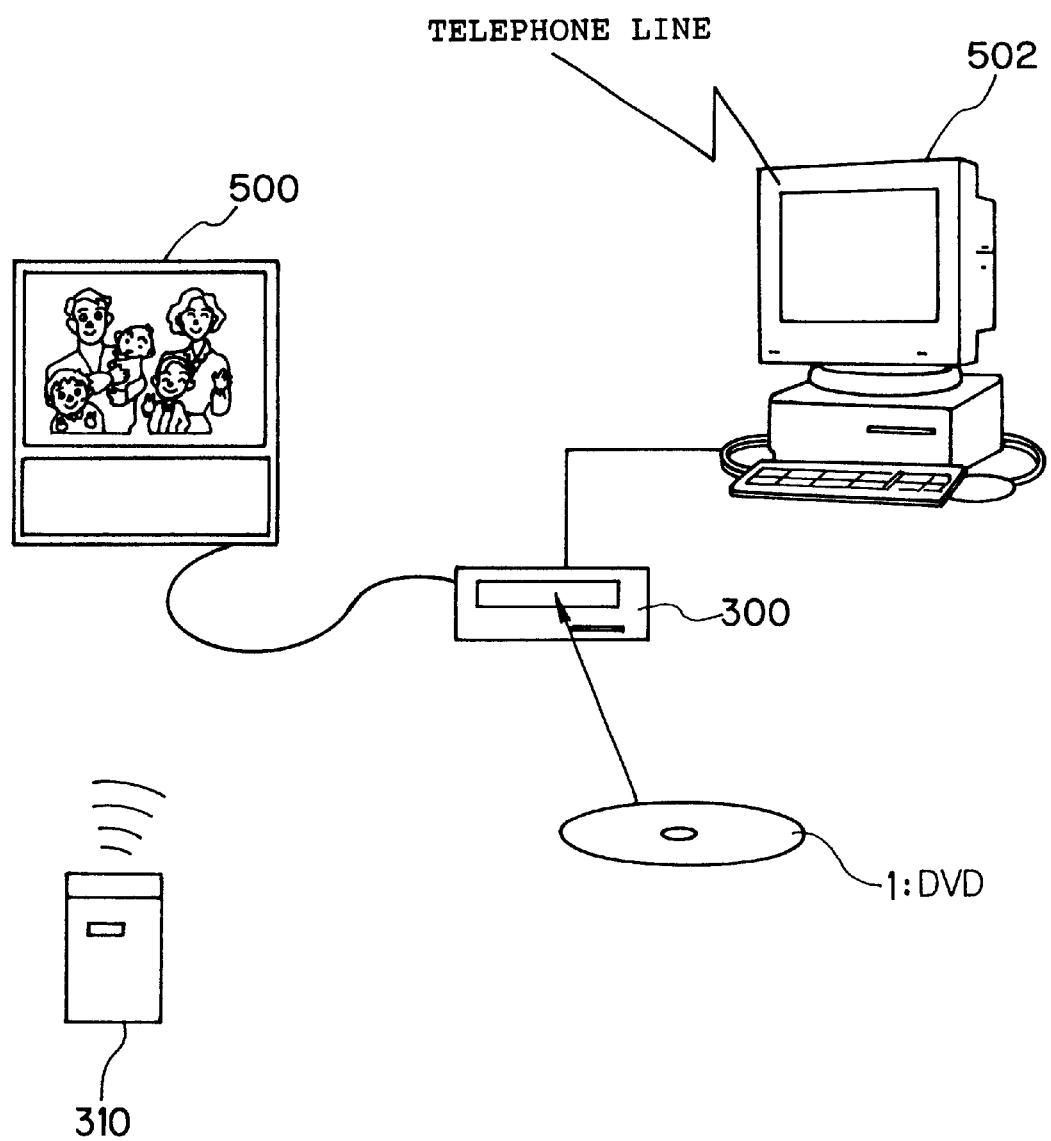
FIG. 6 is a diagram showing a first example of the reproducing apparatus in the present embodiment.

In a first actual example shown in FIG. 6, a reproducing apparatus 300 is connected to a television 500 and a personal computer 502.

In FIG. 6, the DVD 1 is loaded on the reproducing apparatus 300, which reproduces it. The video output and the audio output outputted by the reproducing apparatus 300 (refer to FIG. 4) are inputted through a dedicated cable to an input terminal of the television 500.

The television 500 converts the video output into a video image and converts the audio output into an audio sound. Thus, the dynamic image or the still image corresponding to the record information recorded on the DVD 1 is displayed on the screen of the television 500, and the audio sound in synchronization with the video image is audio-outputted from a built-in speaker. Moreover, the power supply actuation, the input switching and the other operations of the television 500 can be remotely carried out by the remote controller 310 for the reproducing apparatus 300. Also, the television 500 can be remotely operated by a remote controller different from the remote controller 310.

The personal computer 502 is connected through a dedicated cable to the I/O interface 308 of the reproducing apparatus 300. The personal computer 502 is also connected to a telephone line so that it can be connected to the Internet. In this actual example, especially, the power supply of the personal computer 502 is turned on in advance. Accordingly, a dedicated program (hereafter, referred to as an Internet browser) for reading a home page of the Internet is kept active. Then, the personal computer 502 is in a state of waiting for an input of the data in a predetermined form, for example, such as ASCII text data or the like, from the reproducing apparatus 300 as a connection destination address of the Internet.

In this state, for example, when the menu screen 400 (refer to FIG. 5) using the highlight information is displayed on the screen of the television 500, the audience or viewer carries out the selection operation by using the remote controller 310 in accordance with the instruction on the screen. This selection is carried out, for example, by using upward, downward, left and right moving keys, a ten key and a selection determination key mounted on the remote controller 310 and the like. When receiving them, the reproducing apparatus 300 executes the highlight command 404 (refer to FIG. 5) in the highlight information.

In this actual example, especially, the highlight command 404 includes the instruction of ① [reading out from a predetermined position of the DVD 1 (as mentioned above, the text information 216 in the video manager 2 or the UDF 100)] the Internet address information (text data) corresponding to the selected menu and further the instruction of ② [outputting this read out Internet address information through the I/O interface 308]. When such a highlight command 404 is recognized, a highlight command execution program to execute the instructions (the ① and ② instructions) is stored in the ROM 306 of the reproducing apparatus 300, in addition to the other DVD reproduction programs.

Next, operations of the reproducing apparatus 300 in the actual example having the above mentioned configuration are explained with reference to a flowchart in FIG. 7 mainly as for the execution operations of the highlight command as a center.

Figure 7:
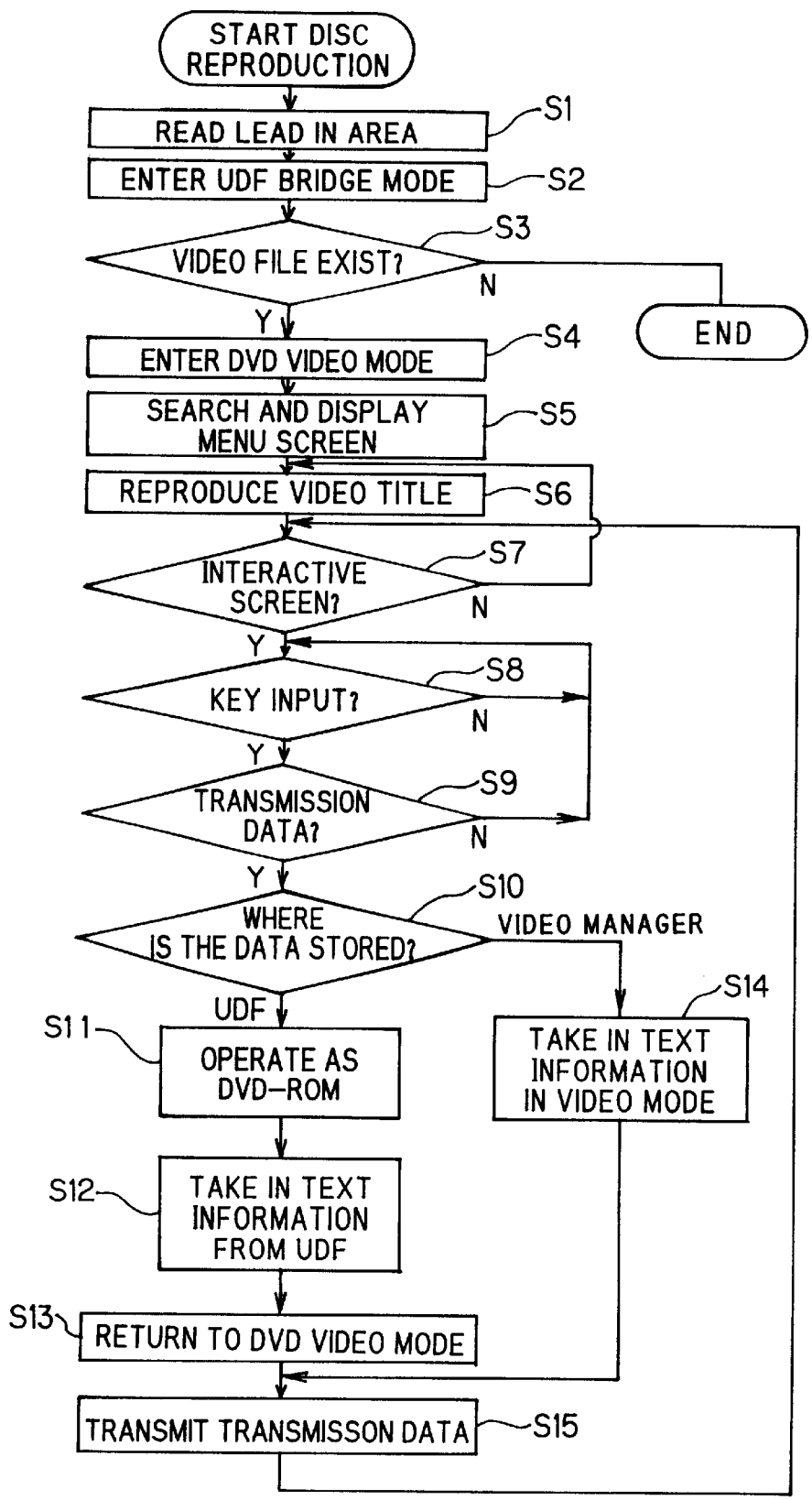
FIG. 7 is a flow chart showing an operation of the reproducing apparatus of FIG. 6.

In FIG.7, when the reproduction of the DVD 1 is started by the remote control operation or the like, the lead in area LI (refer to FIG. 1) of the DVD 1 is firstly read into the reproducing apparatus 300, and various parameters and data necessary to reproduce the DVD 1 is recognized (Step SI). Then, the operational flow enters a UDF (Universal Disc Format) bridge mode (Step S2), and it is judged whether or not a video file exists in the DVD 1 to be reproduced (Step S3). If the video file does not exist therein (Step S3; NO), it is judged that this is not the disc to be reproduced in the television 500, and the reproducing process is ended. On the other hand, if the video file exists therein (Step S3; YES), the operational flow enters a DVD video mode (Step S4). Then, the reproduction of the video information or the like is started, and the reproduction display of the dynamic image or the still image in the television 500 or the like is started. In this case, the video manager 2 following the UDF 100 is firstly read in, and the predetermined data including at least the text information 216 among them is distinguishably stored into a predetermined work area of the RAM 307. Typically, the data size of the text information 216 is not so large. Thus, it is standardized that the predetermined data is stored in advance in the RAM 307 as mentioned above to thereby serve the convenience of a future utilization (that is, the real time control using the text information 21 6 can be carried out for the reproduced and displayed dynamic image). On the other hand, if the DVD 1 is, for example, the DVD-ROM at the step S2, there may be a possibility that the whole disc is composed of the UDF 100. Hence, since there may be a case that the data size of the UDF 100 is not clear and it is very large, the configuration in which the UDF 100 as a whole is stored in the RAM 307 is not employed.

In the DVD video mode, the search of the menu screen such as a title menu or the like is carried out and displayed on the television 500 (Step S5). The reproduction of a video title is started in accordance with the menu selection by the viewer (Step S6). Then, it is judged whether or not the video information during the reproduction or the like provides an interactive screen (Step S7). Unless it is the interactive screen (Step S7; NO), the normal reproduction of the video title is continued. Now, the interactive screen implies a screen on which any selection or request can be carried out by the viewer or audience side, for example, such as the menu selection screen by the highlight information shown in FIG.5 and the screen on which the item that can be requested by a proper button operation is displayed.

On the other hand, if it is judged as the interactive screen (Step S7; YES), it is next monitored whether or not a key input is carried out (Step S8). If the key input is carried out (Step S8; YES), it is judged by the main CPU 305 whether or not the transmission data corresponding to the key input exists (Step S9). Now, the existence of the transmission data corresponding to the key input implies the existence of any data to be read out from the side of the DVD 1 or the RAM 307 and transmitted to the personal computer, for example, such as a case in which the address information of the home page of the Internet is read out and transmitted to the personal computer, based on the highlight command and the like. If the transmission data does not exist (Step S9; NO), the operational flow returns to the step S8, and a next key input is monitored. Incidentally, the operational flow directly returns to the step S7 depending on the picture content, or if the key input is not carried out for a predetermined period, and then a next image can be reproduced.

On the other hand, if the transmission data exists (Step S9; YES), the data store location is further judged (Step S10). In this actual example, the transmission data is the address information of the home page. Then, the text information 216 of the video manager 2 or the UDF 100 is assumed to be the store location.

If the data store location is the UDF 100 (Step S10: UDF), the operational flow once exits from the video mode. This causes the read in position of the optical pickup 301 (refer to FIG. 4) to be moved to the inner circumferential side of the DVD 1, and further causes the DVD 1 to operate as the DVD-ROM in accordance with the UDF bridge mode (Step S11). Then, the address information of the home page of the Internet which is the transmission data judged at the step S9 is taken in from the UDF 100 (Step S12). During the search of this UDF 100, for example, the image of indicating that the image or the data displayed when the key input is carried out is being searched may be displayed on the television 500 as a still image. After the address information is taken in, the operational flow again returns to the DVD video mode (Step S13).

Incidentally, at a time point when the operational flow proceeds to the search of the UDF 100, the main CPU 305 controls so as to store the position of a reproduction track at that time in the RAM 307 (refer to FIG. 4) at the step S12, and then return the reading position beck to the position of this stored reproduction track at the step S13. At this time, the data which has been read in until the operational flow proceeds to the search of the UDF 100 but has not been decoded, or the video output data which has been transiently stored to prepare for the display of a next dynamic image although its decoding has been completed, exists in the reproducing apparatus 300. The management data indicating the progresses of the respective processes in them is transiently stored in the RAM 307 (Step S11). When the operational flow returns to the DVD video mode, they are read out. Then, the process is controlled such that when the operational flow returns to the original reproduction track, the data to be picked up is overlapped with the previous data, but it follows the data already obtained at the previous DVD video mode, and is not repeated or redundant therewith (Step S13).

On the other hand, if the data store location is judged as the text information 216 of the video manager 2 at the step S10, the address information of the home page of the Internet which is the transmission data is taken in as part of the text information 216 from the video manager 2 stored in the RAM 307 at the step S4, while the operational flow remains in the DVD mode (Step S14). That is, this case has an advantage that the complex controls at the steps S11 to S13 are not required, since the DVD is standardized so as to be executed parallel to the reproduction of the dynamic image. However, it is possible to implement so as to take in the text information 216 at a real time similarly to the case of the UDF 100, without storing the video manager 2 into the RAM 307 at the step S4.

When the operation at the step) S13 or 14 is ended, the reproducing apparatus 300 transmits the taken in address information from the I/O interface 308 (refer to FIG. 4) to the personal computer 502 (refer to FIG. 6) (Step S15). Then, the operational flow returns to the step S7 so as to prepare for a next interactive operation. The above mentioned processes are repeated. After that, the reproducing process is ended by the completion of the reproduction of the video title (Step S6) or a forced stop caused by a stop instruction during the reproduction.

The operations of the personal computer 502 performed in parallel to those of the reproducing apparatus 300 are explained with reference to a flowchart in FIG. 8.

Figure 8:
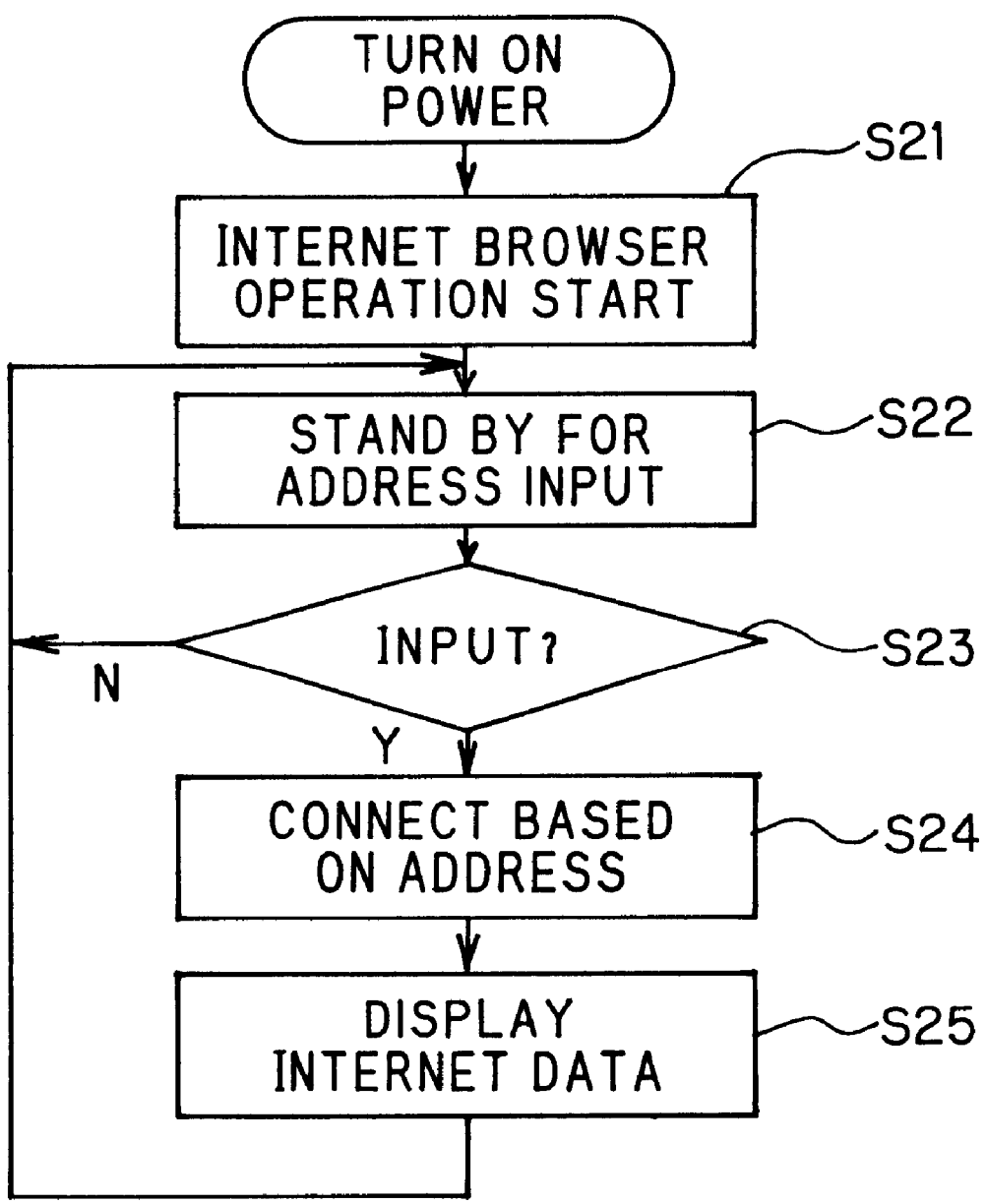
FIG. 8 is a flow chart showing an operation of a personal computer connected to the reproducing apparatus of FIG. 6.

In FIG. 8, when the power supply of the personal computer 502 is turned on, the Internet browser is started by a predetermined key input operation of the viewer or audience (Step S21), and the personal computer 502 is put in a state of stand-by for an address input of the home page at a connection destination (Step S22), and continues to monitor whether or not this address information is inputted (Step S23). For example, the personal computer 502 may be put in a low electric power stand-bymode, in this state of stand-by for the input.

When the reproducing apparatus 300 transmits the transmission data from the I/O interface 308 at the step S15 (refer to FIG. 7), the personal computer 502 to which this transmission data is inputted detects this input (Step S23; YES), and executes the Internet connection based this inputted address information (Step S24). After the connection, the Internet data is displayed, that is, the detailed information and the newest information with regard to the item menu-selected by the viewer or audience of the DVD 1 or the item requested by the button operation are displayed on the screen of the personal computer 502 (Step S25). After this display is ended, the operational flow returns to the step S22 so as to again prepare for a next connection, and is put in the state of stand-by for address.

As explained above, the operations of the reproducing apparatus 300 and the personal computer 502, for example, enable the menu screen shown in FIG. 5 to be displayed in an intermediate portion of an image software for sales promotion or education recorded on the DVD 1. The key input or the remote control operation in the reproducing apparatus 300 enables the newest information and the detailed information with regard to the selected item to be automatically obtained on the personal computer 502 from the home page, and also enables the purchase order corresponding to the selection item to be carried out on the home page. Moreover, the menu screen shown in FIG. 5 can be indicated in an intermediate portion of a reproduction of a movie recorded on the DVD 1, and further the actor's (actress's) clothes and accessory can be purchased by mail order through the Internet. In this case, the menu screen shown in FIG. 5 may be indicated in a form of a window beside a performer in the video image of a program as shown on the television 500 FIG. 6, by using the sub-picture image and the highlight image.

Incidentally, the address information which is the transmission data is recorded in advance as the text information, and then transmitted to the personal computer 502 as the text information (for example, the above mentioned text information in the HTML form), which has a merit that this information can be easily recognized irrespectively of the types of machines and the operating system (OS) in the personal computer 502.

In the DVD 1 in the above mentioned embodiment, the address information of the Internet which is one example of second information is recorded as the text information 216 within the video manager 2 or the UDF 100 (that is, the non-real time information for the image reproduction) based on the DVD standard. However, regardless of it, if the record density is allowable, such address information (second information) may be recorded so as to be reproduced simultaneously with the highlight information which is one example of first information and the highlight command and the button command which are one example of third information (that is, as the real time information for the image reproduction), by using the method, for example, such as a time sharing multiplex, a multiple layer record or the like. Incidentally, the presently mentioned "simultaneous reproduction" implies the substantially simultaneous reproduction, and practically indicates the reproduction in which the utilization of the various information, such as the actual display and the like, can be carried out simultaneously or in parallel as the video data, the highlight information (first information), the highlight command (third information) and the like are transiently stored in the respective buffers even if the read times are not strictly simultaneously. If doing so, it is possible to shorten the search time of the address information (the second information) and reduce the memory capacity to transiently store it.

(II-2) Second Actual Example

Figure 9:
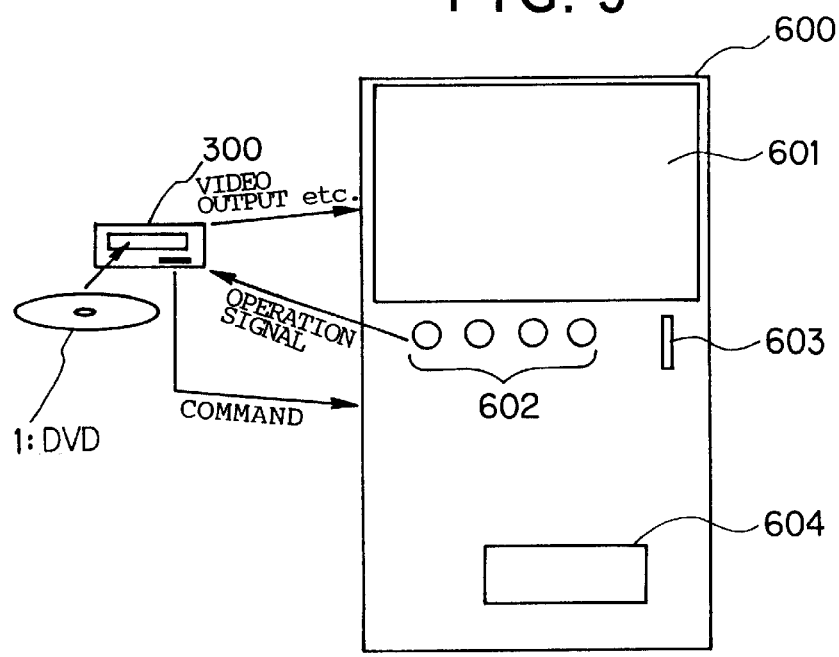
FIG. 9 is a diagram showing a second example of the reproducing apparatus in the present embodiment.

In a second actual example shown in FIG. 9, a reproducing apparatus 300 is connected to a vending machine 600.

In FIG. 9, the DVD 1 is loaded to the reproducing apparatus 300, which reproduces it. The video output and the audio output outputted by the reproducing apparatus 300 (refer to FIG. 4) are inputted through a dedicated cable to an input terminal of the vending machine 600.

The television 601 built in the vending machine 600 converts the video output into a video image and converts the audio output into an audio voice. Thus, the dynamic image or the still image corresponding to the record information recorded on the DVD 1 is displayed on the screen of the television 601, and the audio voice in synchronization with the image is audio-outputted from a built-in speaker. As a result, the video image to explain the product or commodity, for example, such as a game software, a gift or the like, in relation to the sale of the vending machine 600, or the menu screen 400 shown in FIG. 5 is displayed on the television 601.

The vending machine 600 is provided with various buttons 602 for a menu selection and a menu execution. When this button 602 is actuated in accordance with an instruction on a screen, the operation signal thereof is inputted through the cable to the reproducing apparatus 300. In the DVD 1, the control data to control the vending machine 600 is stored in advance in a predetermined location (e.g., the text information 216 of the video manager 2 or the UDF 100). Then, the reproducing apparatus 300 reads out from the DVD 1 the control data corresponding to the operation signal from the vending machine 600, and transmits to the vending machine 600 as a command. The vending machine 600 makes the sale in such a way that a desired product or commodity is supplied to a commodity outlet port 604 based on a throw from a cash or card throw port 603 in accordance with the received command.

According to this actual example, the vending machine 600 can be controlled by using the interactive functions of the reproducing apparatus 300 and the DVD 1 to thereby carry out the complex controls correlated with the video image without the burden to the vending machine 600.

(II-3) Third Actual Example

Figure 10:
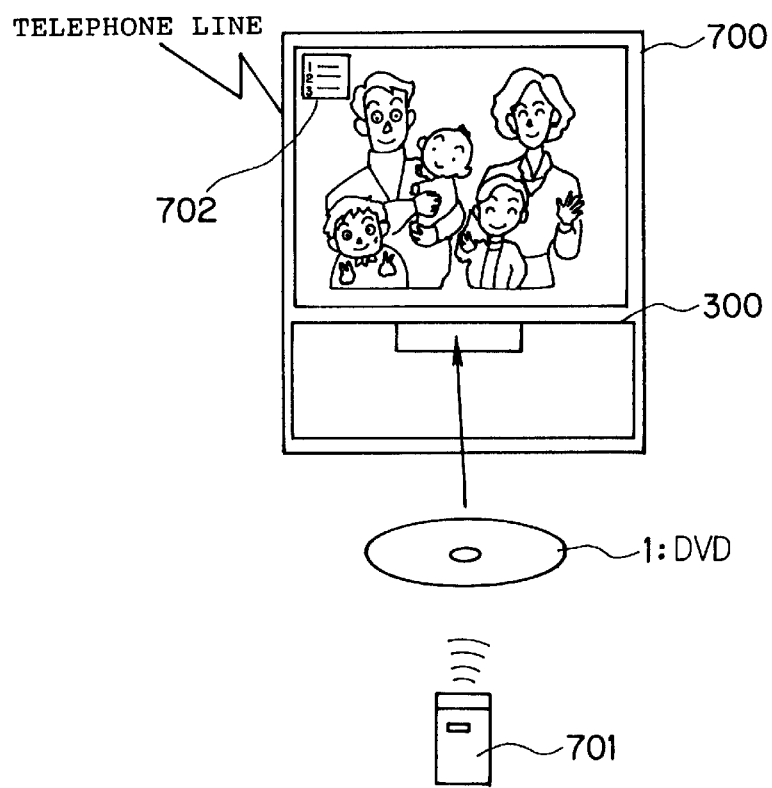
FIG. 10 is a diagram showing a third example of the reproducing apparatus in the present embodiment.

In a third actual example shown in FIG. 10, the reproducing apparatus 300 is built in an Internet television 700 with a built-in DVD. The Internet television 700 with the built-in DVD has the communicating function comprised by the personal computer 502 shown in FIG. 6, in addition to the reproducing apparatus 300, and is connected to a telephone line.

In FIG. 10, the DVD 1 is loaded to the Internet television 700, which reproduces it. The video output and the audio output (refer to FIG.4) outputted by the built-in reproducing apparatus 300 are respectively converted into a video image and an audio voice. Thus, the dynamic image or the still image corresponding to the record information recorded on the DVD 1 is displayed on the screen of the Internet television 700, and the audio voice in synchronization with the image is audio-outputted from a built-in speaker. Moreover, the Internet television 700 is implemented so as to be remotely operated by a dedicated remote controller 701 having the functions of the remote controller 310 for the reproducing apparatus 300 shown in FIG. 4 and the functions of the key board and the mouth of the personal computer shown in FIG. 6, in addition to the basic functions such as the channel operation and the volume operation of the television and the like.

In this state, for example, when the menu screen 400 (refer to FIG. 5) using the highlight information is displayed on the screen of the Internet television 700, the viewer or audience carries out the selective operation by using the remote controller 701 in accordance with the instruction on the screen. Especially, the screen of the Internet television 700 is large. Thus, as shown in FIG. 10, a window (picture-in-picture) screen 702 having a certain size may be opened at an end of the screen by a predetermined operation to thereby indicate the menu screen or the browser screen. Furthermore, the above mentioned menu screen and browser screen may be implemented so as to be switched over to a window screen and a whole screen.

Especially, this actual example may be implemented such that when the viewer moves a cursor to the performer's clothes or accessory by the cursor operation of the remote controller 701 and selects while the viewer is watching the movie by the DVD 1, the Internet television 700 is connected to the Internet and then the information, such as a price of the clothes, a bland name or the like is searched.

According to this actual example, the Internet television 700 can be controlled by using the interactive functions of the reproducing apparatus 300 and the DVD 1 to thereby carry out the complex controls correlated with the video image without the burden onto the controller of the television body in the Internet television 700 and the like.

As described above in detail, according to this embodiment, the control correlated with the complex video image resulting from the especially compressed record of the video information can be carried out by the viewer's simple operation, for the various external apparatuses, such as the personal computer 502, the vending machine 600, the Internet television 700 and the like, based on the interactive functions of the reproducing apparatus 300 and the DVD 1, without the hardware and software burdens onto the external apparatuses. Hence, this embodiment provides a great convenience on a practical use.

When this embodiment is compared with the case in which a personal computer and the program for the personal computer controlling the optical disc are used, the reproducing apparatus 300 for the DVD 1 reproducing the image is quick in operation start, as long as the control with regard to the video image is carried out. Since the control data is stored in the DVD 1, the reliability and the stability of the data are high. Moreover, this embodiment is mainly carried out in accordance with the selection operation by the menu form or the like. Thus, this embodiment has a merit that the operation is easy for the viewer and a special knowledge is not required with regard to the maintenance. Especially, if the video information is compressed and recorded as in the DVD, it is basically extremely difficult to carry out the accurately time control, which is correlated with the video information to be reproduced, in the conventional control method performed through the reproducing apparatus by using the personal computer. Thus, from the viewpoint of the above mentioned difficulty, it may be understood that the embodiments of the present invention have the extremely excellent configuration in which the above mentioned control is mainly carried out by the reproducing apparatus 300. Furthermore, the control data is transmitted to the external apparatuses in the ASCII text form. Hence, it is possible to control the various external apparatuses correspondingly to the form. This results in a merit that the application software of the personal computer and the Internet terminal can be also operated.

Incidentally, various applications described below are possible in the reproducing apparatus 300 according to the embodiments. For example, the content recorded on the DVD 1 is explained such that the methods for actuating and diagnosing a manufacturing plant, a manufacturing facility and the like are sequentially explained by using the image. Then, the proper button operation or menu selection is carried out at a necessary point. Accordingly, the control instruction and the various data are read out from the DVD 1 and then transmitted to the controller of the manufacturing plant or the like, and further the controller is driven.

As described above in detail, according to the present embodiments, it is possible to reduce the burden on the external apparatus when the control correlated with the video information is performed with respect to the external apparatus, and a user interface, which is easy for the viewer or audience to operate and is relatively economical can be realized.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.09-164449 filed on Jun. 20, 1997 including the specification, claims, drawings and summary is incorporated herein by reference in its entirety.

What is claimed is:

1. An information recorded medium on which information to be reproduced by an information reproducing apparatus connected to an external apparatus is recorded, said information comprising:

compressed video information;

first information, which relates a predetermined image portion in a video image reproduced by said information reproducing apparatus on the basis of the video information, is defined with respect to a position of the predetermined image portion in the reproduced video image, and is recorded at a record position, where said first information can be reproduced simultaneously with the predetermined image portion by said information reproducing apparatus, on said information reproducing medium;

second information, which is defined in correspondence with the first information and is recorded at a predetermined record position on said information record medium; and third information, which includes the record position of said second information on said information record medium and includes a command to transmit said second information to said external apparatus after reading out said second information, wherein said third information is stored on said information record medium.

2. An information record medium according to claim 1, wherein said video information comprises a dynamic image information to display a dynamic image, which is compressed on a time axis, and a still image information to display a still image, which is 2-dimensionally compressed.

3. An information record medium according to claim 1, wherein said first information includes specific image information to display the predetermined image portion in a display manner different from that for a portion other than the predetermined image portion in the reproduced video image.

4. An information record medium according to claim 1, wherein said information record medium comprises a DVD.

5. An information record medium according to claim 1, wherein said second information includes address information in a communication network, and said external apparatus comprises an apparatus which can be connected to an address indicated by the address information on the communication network.

6. An information record medium according to claim 1, wherein said second information includes control information to controls aid external apparatus in relation to the reproduced video image, and said external apparatus comprises an apparatus which can be operated in accordance with the control information.

7. An information reproducing apparatus connected to an external apparatus, for reproducing an information record medium on which information to be reproduced is recorded, said information comprising:

compressed video information;

first information, which relates a predetermined image portion in a video image reproduced by said information reproducing apparatus on the basis of the video information, is defined with respect to a position of the predetermined image portion in the reproduced video image, and is recorded at a record position, where said first information can be reproduced simultaneously with the predetermined image portion by said information reproducing apparatus, on said information reproducing medium;

second information, which is defined in correspondence with the first information and is recorded at a predetermined record position on said information record medium; and third information, which includes the record position of said second information on said information record medium and includes a command to transmit said second information to said external apparatus after reading out said second information, wherein said third information is stored on said information record medium, said information reproducing apparatus comprising:

(i) a reading device for reading out said video information, said first information, said second information and said third information from said information record medium;

(ii) a processing device for applying predetermined processes including an expanding process for said video information with respect to the read out information to generate output data for displaying the video image;

(iii) an inputting device for inputting a selection instruction related to the position of the predetermined image portion;

(iv) a first recognizing device for recognizing said first information from the read out information, which is defined with respect to the position of the predetermined image portion in accordance with the selection instruction inputted by said inputting device;

(v) a second recognizing device for recognizing the third information corresponding to the first information recognized by said first recognizing device from the read out information;

(vi) an extracting device for extracting the second information which is recorded at the record position included in the third information recognized by said second recognizing device; and (vii) a transmitting device for transmitting the extracted second information to said external apparatus in accordance with the command included in said third information recognized by said second recognizing device.

8. An information reproducing apparatus according to claim 7, wherein said second information is recorded at the record position where said second information cannot be reproduced simultaneously with the predetermined image portion by said information reproducing apparatus, said information reproducing apparatus further comprises:

a controlling device for controlling said reading device to read out said second information in advance of reading out said video information; and a memory device for storing said second information which has been read out in advance by said reading device, and said extracting device extracts said second information through said memory device.

9. An information reproducing apparatus according to claim 7, wherein said second information is recorded at the record position where said second information cannot be reproduced simultaneously with the predetermined image portion by said information reproducing apparatus, said information reproducing apparatus further comprises a controlling device for controlling said reading device to read out said second information after reading out said video information, and said extracting device extracts said second information read out after said video image.

10. An information reproducing apparatus according to claim 7, wherein said first information includes specific image information to display the predetermined image portion in a display manner different from that for a portion other than the predetermined image portion in the reproduced video image, and said processing device comprises an emphasis display device for generating the output data for displaying the video image so as to display the predetermined image portion, which is selection-instructed by said inputting device, in the different display manner in accordance with the specific image information.

11. An information reproducing apparatus according to claim 7, wherein said information record medium comprises a DVD, and said information reproducing apparatus comprises a DVD player.

12. An information reproducing apparatus according to claim 7, wherein said second information includes address information in a communication network, said external apparatus comprises an apparatus which can be connected to an address indicated by the address information on the communication network, and said transmitting device transmits the address information to said external apparatus.

13. An information reproducing apparatus according to claim 7, wherein said second information includes control information to control said external apparatus in relation to the reproduced video image, said external apparatus comprises an apparatus which can be operated in accordance with the control information, and said transmitting device transmits the control information to said external apparatus.

14. An information reproducing apparatus according to claim 7, wherein said information reproducing apparatus is built in said external apparatus.

15. An information reproducing method, in an information reproducing apparatus connected to an external apparatus, of reproducing an information record medium on which information to be reproduced is recorded, said information comprising:

compressed video information;

first information, which related a predetermined image portion in a video image reproduced by said information reproducing apparatus on the basis of the video information, is defined with respect to a position of the predetermined image portion in the reproduced video image, and is recorded at a record position, where said first information can be reproduced simultaneously with the predetermined image portion by said information reproducing apparatus, on said information reproducing medium;

second information, which is defined in correspondence with the first information and is recorded at a predetermined record position on said information record medium; and third information, which includes the record position of said second information on said information record medium and includes a command to transmit said second information to said external apparatus after reading out said second information, wherein said third information is stored on said information record medium, said information reproducing method comprising:

(i) a reading process of reading out said video information, said first information, said second information and said third information from said information record medium;

(ii) a processing process of applying predetermined processes including an expanding process for said video information with respect to the read out information to generate output data for displaying the video image;

(iii) an inputting process of inputting a selection instruction related to the position of the predetermined image portion;

(iv) a first recognizing process of recognizing said first information from the read out information, which is defined with respect to the position of the predetermined image portion in accordance with the selection instruction inputted by said inputting device;

(v) a second recognizing process of recognizing the third information corresponding to the first information recognized by said first recognizing device from the read out information;

(vi) an extracting process of extracting the second information which is recorded at the record position included in the third information recognized by said second recognizing device; and (vii) a transmitting process of transmitting the extracted second information to said external apparatus in accordance with the command included in said third information recognized by said second recognizing device.

* * * * *

UNITED STATES PATENT AND TRADEMARK OFFICE
CERTIFICATE OF CORRECTION

PATENT NO. : 6,434,326 B1 Page 1 of 1
DATED : August 13, 2002
INVENTOR(S) : Toshiyasu Kondo, Wataru Negishi and Shoichi Katagiri It is certified that error appears in the above-identified patent and that said Letters Patent is hereby corrected as shown below:

Column 24,
Line 47, "recorded" should read -- record --.
Lines 60-61, "reproducing" should read -- record --.

Column 25,
Line 29, "controls aid" should read -- control said --.
Lines 47-48, "reproducing" should read -- record --.

Column 27,
Line 36, "related" should read -- relates --.
Lines 44-45, "reproducing" should read -- record --.

Signed and Sealed this

Twenty-fourth Day of December, 2002

JAMES E. ROGAN
*Director of the United States Patent and Trademark Office*